Jan. 6, 1948.     L. D. VOLK     2,434,133
SUTURING DEVICE
Filed Oct. 20, 1945     3 Sheets-Sheet 1
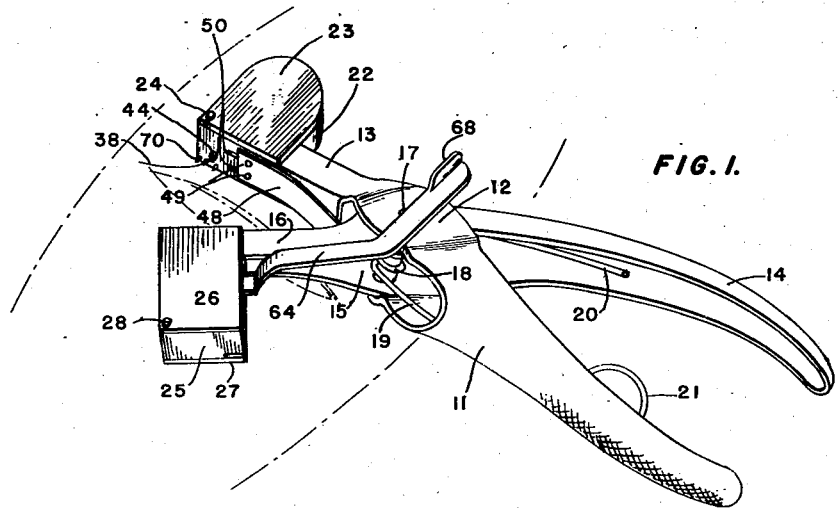
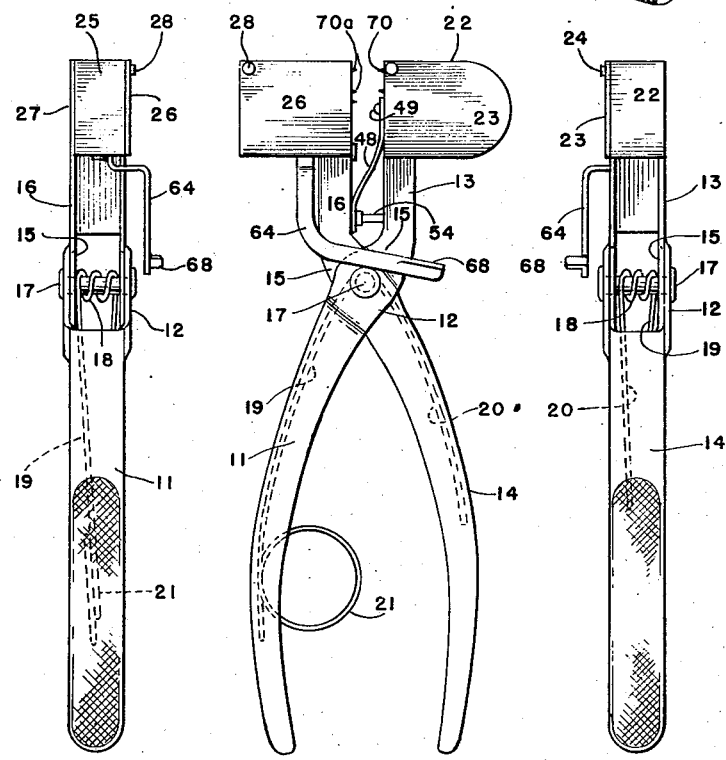
FIG.2.     FIG.3.     FIG.4.
INVENTOR.
LESTER D. VOLK,
BY Irving Seidman
ATTORNEY Jan. 6, 1948.  L. D. VOLK  2,434,133
SUTURING DEVICE
Filed Oct. 20, 1945  3 Sheets-Sheet 2
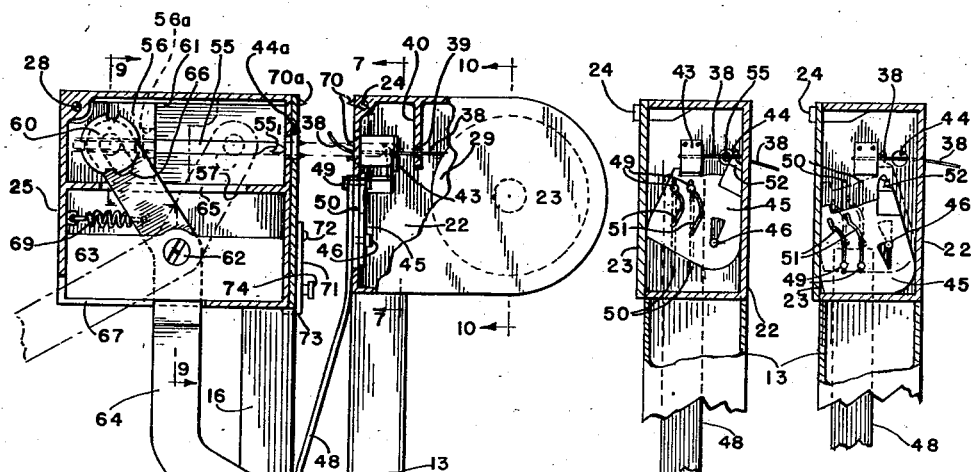
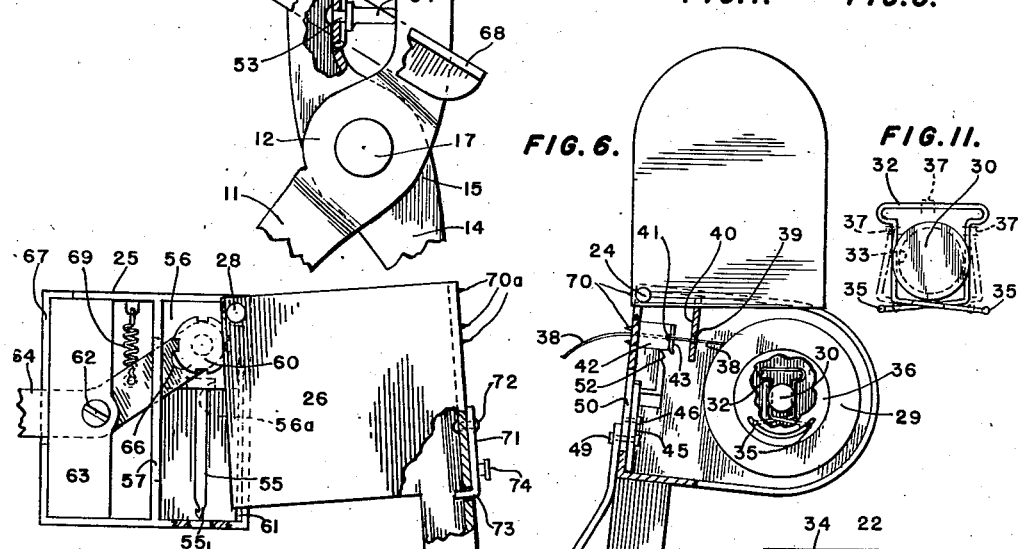
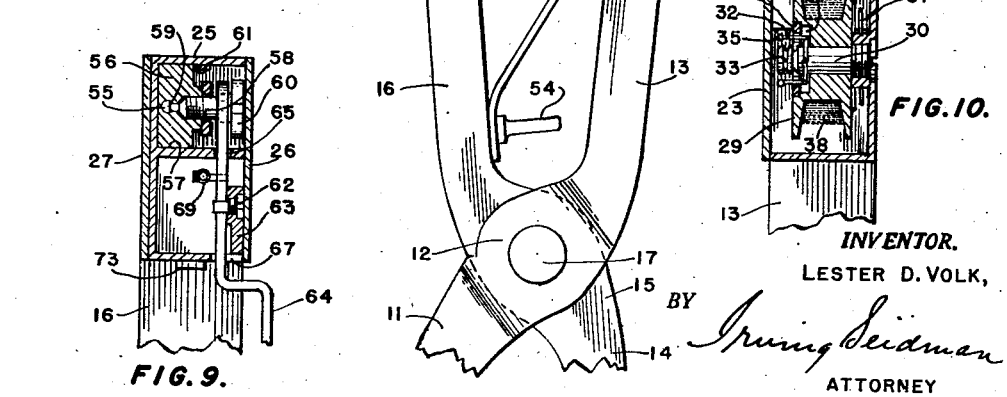
INVENTOR.
LESTER D. VOLK,
BY
*Irving Seidman*
ATTORNEY

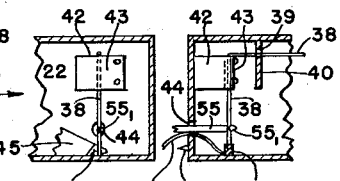

Patented Jan. 6, 1948

2,434,133

UNITED STATES PATENT OFFICE 2,434,133

SUTURING DEVICE

Lester D. Volk, Brooklyn, N. Y.

Application October 20, 1945, Serial No. 623,498

14 Claims. (Cl. 112—169)

This invention relates to improvements in portable, hand-operated, single thread stitching machines applicable for stitching, sewing, basting and weaving, or by a surgeon for suturing purposes, or for crocheting and knitting.

Portable stitching machines using a single thread have been made, but all such machines require the use of both hands by the operator of the machine.

One object of the invention herein set forth is to provide a machine so small and compact that the stitching operation may be performed by using one hand only.

Another object of this invention is to provide a machine of the type set forth including a means for forming, with a single thread, an interlocking, looped stitch.

A further object is the provision, in a sewing machine, of the type specified and set forth, of special means to feed the thread to the needle and wherein the said thread is picked up by the said needle to form successive loops, each loop passing through a preceding loop to form a tightly drawn efficient stitch.

Another object of this invention is to provide a portable sewing machine of the type described which is particularly adapted for use by surgeons to suture cuts, gashes and open flesh wounds.

A still further object of the said invention is to provide a sewing machine of the character described comprising means for positioning the thread to line up with the needle point.

Another object of this invention is the inclusion of a needle actuating means which may be controlled by a finger of the hand holding and operating the machine.

A further object of the invention is the inclusion of a special form of needle having a transverse channel to receive and retain the suturing material or thread.

A further object of this invention in its application for suturing purposes, is the inclusion of a needle having specially arranged cutting edges which, when the needle is withdrawn from the flesh, allows the cut edges of the tissue to come together quickly and close the cut, thus preventing undue loss of blood.

Another feature of this invention is the means provided for grasping and holding the parts to be stitched or sutured.

Still a further object of this invention is the provision of an organization in which the constituent elements are so arranged structurally and functionally, as to assure improved results with materials and members which may be manufactured at reasonable cost, may be easily assembled and which will be efficient and economical in operation with minimum wear to the parts.

The invention possesses other objects and features of advantage, some of which, with the foregoing, will be set forth in the following description and in the claims wherein parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a perspective view of the sewing machine.

Fig. 2 is an end view of the device.

Fig. 3 is a side view of same.

Fig. 4 is a view of the end opposite to that of Fig. 2.

Fig. 5 is an enlarged side view of a portion of the device and shows portions broken away and sectional in order to better illustrate the parts.

Fig. 6 is a view similar to that of Figure 5, but with the jaws open and some of the parts pulled out as will be hereinafter explained.

Fig. 7 is a sectional view taken along line 7—7 of Fig. 5, looking in the direction indicated by the arrows.

Fig. 8 is a sectional view similar to Fig. 7 but showing another position of a movable part.

Fig. 9 is a sectional view taken along the line 9—9 of Fig. 5, and looking in the direction indicated by the arrows.

Fig. 10 is a sectional view taken along line 10—10 of Fig. 5, looking in the direction of the arrows.

Fig. 11 shows a detail of the spring clip for holding a spool in place.

Figs. 12 to 19, inclusive, are detail views showing the successive positions of a thread positioning and holding finger and will be hereinafter fully explained.

Figs. 20 to 25 are diagrammatic views showing the progressive operation of the needle in forming looped stitches and are very much enlarged.

Fig. 26 is a side view of the needle also very much enlarged.

Fig. 27 is a top view of the needle also very much enlarged.

Fig. 28 is a greatly enlarged section of the needle taken along the line 28—28 of Fig. 26, and looking in the direction indicated by the arrows; and Fig. 29 is also an enlarged section of the needle taken along the line 29—29 of Fig. 26 and looking in the direction indicated by the arrows.

Referring in detail to the parts, 12 and 15 are two members of an operating unit and are pivotally connected at 17. The member 12 is formed with a hand gripping end 11 extending from the pivotal connection 17 and has an extending grasping jaw 13 which carries upon its outer end a thread housing unit. The member 15 is also formed with a hand gripping end 14 extending from the pivotal connection 17 and has an extending grasping jaw 16 which carries upon its outer end a needle housing unit.

The two hand gripping ends 11 and 14 and the jaws 13 and 16 are normally held in open position as shown in Fig. 1, by means of a spring 18 spirally wound around pin 17, and formed with an extension or leg 19 which engages against the end 11 of the member 12 and with an extension or leg 20 which engages against the end 14 of the member 15. A finger ring 21 formed near the end of the extension 19 provides a finger hold to facilitate the operation of the machine.

When the said hand gripping ends 11 and 14 are brought together and allowed to separate in alternating and successive order, the action will be transferred to the needle and thread mechanism as will be hereinafter set forth.

Upon the end 13 of member 12 there is provided a housing 22 having a swinging cover 23 pivotally connected to the said housing by means of pivot 24. Within this said housing is the thread mechanism which will be hereinafter fully explained. To the end 16 of the member 15 there is attached a housing 25 formed by a top plate 26 and bottom plate 27, which are attached to the said end 16. The said housing 25 is pivotally mounted between the said top and bottom plates 26 and 27, respectively, by means of a pin 28. This housing 25 contains the needle operating mechanism and will be fully described hereinafter.

Referring now to the enlarged details of the thread mechanism housing 22 shown in Figs. 5, 6, 7, 8, 10 and 11, a spool 29 is shown mounted upon a pin 30 within the said housing 22 and, disposed between the spool 29 and rear housing wall, is a spring 31 against the pressure of which the spool 29 is held by means of a spring clip 32 which is adapted to engage and lock in one of the annular grooves 33 formed upon the free end of said pin 30. A recess 34 is formed in the spool 29 and provides a pocket for the spring clip 32.

The said spring clip 32 is adjustable in the grooves 33 and by setting the clip in either of the said grooves, the spring 31, between the rear wall of the housing 22 and the spool 29, may be compressed or allowed to expand thereby increasing or decreasing the force of same against the spool to adjust the spring tension against same.

In Fig. 11 this said spring clip is clearly shown as it engages a groove 33 upon the said pin 30. The said clip 32 is formed with extending ears or finger holds 35 which afford a means for releasing said clips from the said grooves 33 as indicated by the dot and dash lines of Fig. 11. A plate 36 rests in an annular ledge over the aforesaid recess and is held therein by means of clamps 37 formed in the cover plate 36, and engaging the said spring clips 32. The relative position of the said clamps 37 is shown by the dotted lines in Fig. 11. The thread 38 is lead from the spool through a guiding aperture 39 in a plate 40 within the housing 22, and then downwardly in a groove 41 formed in a block 42. The said thread is held within the said groove by means of a flat spring 43 which is attached to said block 42. From the said groove 41 the thread continues downwardly to an opening 44 through which it passes out of the said housing 22.

During the operation of the device, a needle point enters this opening to pick up the thread as will be subsequently explained. However, the thread must be positioned in such a manner that the needle point will readily find the thread. The positioning of the thread 38 is accomplished by means of what will be termed a thread positioning member 45 which is mounted within the said housing 22 as shown in Figs. 5, 6, 7 and 8. A pin 46 is secured to the front wall of the casing 22 and engages through the triangular opening 47 in said thread positioning member 45, allowing the said member 45 a sliding movement as shown in Fig. 8 by the dot and dash lines. This sliding movement is followed by a partial rotary movement as indicated in Fig. 7. These movements are imparted to the said thread positioning member 45 by means of a spring band 48 to the upper end of which there is secured two pins 49 which engage through slots 50 in the front wall of said casing 22 and in slots 51 where the said pins 49 fit tightly in place. The reason for this tight or snug fit will be explained further on in this description.

At a point nearest the opening 44 in the housing 22 there is formed upon the said thread positioning member 45, and offset therefrom, (see Figs. 5 and 6), a pointed hook or finger 52 which by its motion, just described, passes first behind the thread 38 as shown by the dot and dash lines in Fig. 8, then downwardly, drawing the said thread down with it as shown in Fig. 7.

It will be noted that the pins 49 travel in a straight line through the said slots 50 and while so travelling, their movement in the curved slots 51 in said thread positioning member 45, causes the said member 45 to pivot about said pin 46 or proceed in a straight line when the straight portion of said curved slots 51 line up and become parallel to the slots 50. The lower end of the said spring band 48 is attached to the aforesaid end 16 where it is secured against movement by means of a rivet 53 having an extending stop member 54.

In Fig. 5, the pivotally joined members 12 and 15 are shown in closed position, that is, the ends 13 and 16 of said members are brought together so that they are parallel to one another, the stop 54 acting to limit the closing movement. When the said ends 13 and 16 are brought together as described, a needle 55, slideably mounted within the aforesaid housing 25 is brought into alignment with the aforesaid opening 44, and thread 38 in the said housing 22. The said needle 55 is secured upon a block 56 slideably mounted within the aforesaid housing 25 and reciprocally riding upon a shelf or ledge 57. The needle 55 is held securely upon the sliding block 56 by means of a set screw 58 (see Fig. 9), engaging in a threaded boring in said sliding block. The end of said needle 55 is flattened as at 59, (see Figs. 26 and 27), and is provided with a sloping recessed portion 59a which engages the said set screw 58 which in turn is tightened against said flattened surface by the notched head member 60 formed thereon. A guiding strip 61 engaging against the said sliding block 56 is provided to keep said sliding block in perfect alignment. Pivotally attached at 62 to a supporting member 63 is a lever 64 which extends upwardly through a slot 65 in the ledge 57 and pivotally engages the said sliding block 56. A slot 66 is formed in the upper end of said lever 64 and engages around a shoulder formed upon said set screw and ties the said lever 64 to said sliding block 56. The lower portion of said lever 64 extends through a slot 67 at the bottom of housing 25 and thence downwardly at an angle to a finger contact 68 at its extreme end. The movement of the said lever 64 to the position shown by the dot and dash lines in Fig. 5 causes the needle carrying block 56 to move outwardly, carrying the needle 55 into the opening 44 to contact the thread 38 in the housing 22. A spring 69, one end of which is attached to said lever 64, and its other end to a wall of the housing, acts to normally keep the sliding block 56 and its attached needle 55 in its retracted position. Gripping or grasping prongs 70 and 70a are formed upon the housings 25 and 22, respectively, and are adapted to grasp and hold the material to be sewn.

Access to the mechanism within the housing 22 is provided by means of the pivotal cover plate 23, and in Fig. 6, the said cover plate 23 is shown swung back, exposing the interior of said housing 22. In the case of the housing 25, the cover plates 26 and 27 are fixed and stationary while the said housing 25 swings outwardly, exposing the mechanism therein as also shown in Fig. 6. A spring clip 71, secured to the casing 25 at 72 and having an inwardly turned lip 73 engages the lower end of the housing 25 to hold same in closed position. A knob 74 may be provided to pull out the said clip 71 to release the housing 25.

The needle 55 is formed with a transverse groove 55—2 to form a hook 55¹, to engage the thread 38. The successive relative positions of the thread engaging finger 52 of the thread positioning member 45 with the thread 38 are shown in the part elevational views of Figs. 12, 14, 16 and 18, while views of the parts looking in the direction indicated by the arrows are shown in Figs. 13, 15, 17 and 19. In Figs. 12 and 13 the positioning finger 52 is shown in its retarded or inoperative position. In Figs. 14 and 15 the said finger 52 has moved forward behind the thread 38. Figs. 16 and 17 show the finger 52 in its lowered position having drawn the thread 38 downwardly and show the hook 55¹ of the needle engaging the thread 38. Figs. 18 and 19 show the thread 38 drawn out of the housing 22 by the withdrawal of the needle 55 through the aperture 44 and forming a loop as shown in Fig. 19. Continuing the sewing operation by the opening and closing movements of the jaws 13 and 16, the needle 55 again enters the housing 22 through the aperture 44, keeping within the loop just formed and again picks up the thread 38 which has again been brought to the position shown in Figures 16 and 17 and draws it out through the said aperture 44 and through the loop previously formed. The successive movements of the needle and thread as they form the successive loops are diagrammatically indicated in Figs. 20, 21 and 22. In Figures 20 to 25 inclusive the edges to be sewn are indicated by the dot-dash lines. In Figure 20 the needle 55 has been forced through the edges to be sewn and has hooked the thread 38 which is then drawn back in the form of a loop shown in Figure 21. The apparatus is then moved downwardly in the direction of the stitching movement indicated by the arrow x in Figure 25, as far as the length of the loop or stitch desired, whereupon the needle is again forced through the edges to be stitched, hooked around the thread 38 as shown in Figure 22, and then withdrawn pulling the thread through the perforations formed in the stitched edges and through the loop already formed, to form a second loop shown in Figure 23. The device is again moved along the edges to be stitched and the needle is again forced through the edges to be stitched and hooked to the thread as shown in Figure 24. It is then pulled out forming another loop as shown in Figure 25. This reciprocal movement of the needle and forward movement of the stitching apparatus is continued until the edges to be stitched are brought together through the length required to be stitched. The thread is then cut and the cut end pulled through the last loop as indicated by the dot and dash line in Fig. 25. Pulling this end taut locks the stitching. For a basting stitch the cut end of the thread is not pulled through the last loop to lock the stitch.

For surgical purposes, a specially designed needle, shown in Figs. 26 to 29, inclusive, is proposed for use. This needle is formed with longitudinally arranged channels 55a and cutting edges 55b and 55c, and a hook end 55¹ with a transverse channel 55². This particular formation of channels and cutting edges provides a suturing needle which makes small tissue cuts which will quickly come together to close the aperture made by the needle when same is withdrawn from the tissue, thereby preventing undue loss of blood and permitting rapid healing of the wound.

In operation, when the machine is employed for a suturing operation, the same is threaded as hereinbefore described, a suturing needle mounted in the sliding block as described and the machine applied to the cut to be sutured as shown in Fig. 1, where a limb having a cut in the flesh is shown by the dot and dash lines. The hand grasping ends 11 and 14 are brought together thereby bringing the jaws 13 and 16 together as shown in Figs. 3 and 5. The stop 54 acting to limit the movement to the point desired. This action, through the connecting band 48, slides the pins 49 in the grooves 50 and 51 carrying the thread positioning member 45 first through its forward sliding movement to the thread engaging position shown in Figs. 14 and 15 and then through its rotary movement as shown in Figs. 16 and 17 to the position shown in Fig. 7. The beginning or straight portion of grooves 51 are adapted to fit somewhat tightly around the pins 49 so that the frictional contact is sufficient to keep the pins 49 fixed in the straight grooves 51 until the thread positioning member 45 reaches the end of its first intermediate operative movement shown by dot and dash lines in Fig. 8 and engages the thread 38. The triangular opening in member 45 slides forward to the narrow end of the triangular opening and is stopped by the pin 46 which holds the said member 45 against further forward movement.

At this point the continued forward movement of the pins 49 in slots 50 and through the curved portions of slots 51 forces the finger 52 of the member 45 downwardly as shown in Figs. 5 and 7. In its downward movement the said finger 52 draws the engaged thread 38 with it from and against the tension of the spool 29 as shown in Figs. 16 and 17. At this point the operator holds the instrument in its closed position (see Fig. 5) and the prongs 70 and 70a engage the tissues on each side of the cut, grasp the tissues, approximate the edges, and hold them in apposition for the suture. With the thumb of the hand holding the instrument, the operator contacts and pushes the end 63 of the lever 64 to force it back and thereby moves the block 56 which carries the needle 55 through the edges of the cut and into the opening 44 to pick up the thread 38. Now, releasing the lever 64, the action of the spring 69 pulls the needle 55 back into its housing drawing with it the loop of the thread 38 which is engaged over the hook end 55'. The operator then releases the pressure on the hand grasping ends 11 and 14 thereby permitting the jaws 13 and 16 to separate as shown in Fig. 6.

As the hand grasping ends 11 and 14 separate or move apart, the connecting band 48 retracts the pins 49 in the grooves 50 and 51 which draws member 45 back through its sliding and rotating movements to the thread releasing position as shown in (the solid outline) Fig. 8.

The triangular opening in member 45 slides backward to the upper angle of the broad end of the triangular opening and further movement is stopped by pin 46. At this point the continued free movement of the pins 49 in slots 50 and the curved portion of 51 partially rotates member 45 thus pulling finger 52 upward to the opening position shown by the solid lines in Fig. 8 withdrawing the finger 52 from the loop of thread 38 and freeing it.

The opening of jaws 13 and 16 as shown in Fig. 6 releases prongs 70 and 70a from the tissues on each side of the cut. The instrument is then placed by the operator in its new location and in so doing the free loop of thread is drawn from the container 22 through opening 44 and the perforation in the tissue and channel 55² of needle 55, thereby taking up the slack.

The needle carrying block 56 is formed with a recess 56a to provide a pocket for the looped thread when the said block 56 is brought to the end of its outward movement, and the needle opening 44a in the housing 25 (Figure 5) is tapered to allow clearance for the thread.

For general sewing or other uses than suturing as just described, the operation of the machine is the same except that an ordinary needle with a cross channel is used and thread substituted for the suturing material.

I claim:

1. A hand operated sewing machine, comprising a pair of pivotally joined handles having grasping jaws formed thereon, spring means engaging between the said handles adapted to hold the said handles and grasping jaws in a normal open position, a housing containing a spool of thread and a thread positioning mechanism secured to the end of one of the grasping jaws, a second housing pivotally attached to the end of the second grasping jaw, a needle having a hook end and slideably mounted within the said second housing, a finger and spring operated lever pivotally attached upon the said second housing and adapted to give reciprocal movement to the needle, the said needle being adapted to engage the thread carried upon and positioned by the said thread positioning mechanism to form loops and stitches, and a flexible band, one end of which is secured to one of the said grasping jaws and having upon its other end pins slideably engaging through slots in the said thread housing upon the other grasping jaw and adapted to engage and actuate the said thread positioning mechanism during the closing and opening action of the said jaws.

2. The device of claim 1, wherein the thread-positioning means comprises a finger adapted to move into engagement with said thread to bring same into alignment with said needle.

3. The device of claim 1, wherein the thread positioning member is slideably and pivotally movable in its housing and comprising pins formed upon the said flexible operating band, said pins engaging in lineal slots formed in said housing and extending through and engaging in curved slots in the said thread positioning member, and a pin fixed to said housing and engaging in and through a triangular slot in said thread-positioning member to allow a sliding and partial rotary movement to the said thread-positioning member.

4. The device of claim 1, including a thread guiding plate having a thread aperture therein and arranged within the said thread housing, a block having a thread groove thereon and alined with the said thread guiding plate and a spring holding means upon the said plate and engaging with the thread groove to hold the thread in said groove.

5. The device of claim 1, including a pivotally attached cover plate upon the said housing for the thread positioning mechanism, thereby providing accessibility to said mechanism.

6. The device of claim 1, wherein the said housing for the needle operating mechanism is pivotally attached to allow the said housing to swing out to make the said needle operating mechanism easily accessible.

7. The device of claim 1, including a thread carrying spool, a pin attached to said housing and adapted to carry said spool, and a detachable spring means for securing the said spool upon said pin, and means for regulating the tension of the thread.

8. The device of claim 1, including grasping prongs formed upon the ends of said grasping jaws, adapted to grip and hold the edges of the material to be sewn.

9. The device of claim 1, including a pin means between said grasping jaws and fixed to one of said jaws and adapted to limit the closing movement of said jaws to bring said needle in alignment with said thread-feeding mechanism.

10. The device of claim 1, including a spring-locking means adapted to hold the housing for the needle mechanism in its closed position.

11. In a portable, hand operated sewing machine, a pair of pincer-like members having handles and grasping jaws, a thread feeding mechanism mounted upon one of the said grasping jaws, a plunger type needle reciprocally mounted upon said second grasping jaw, means for reciprocally moving said needle, a flexible operating band fixed at one end to one of the said grasping jaws and slideably attached at its other end to the said other grasping jaw and slideably connected to the said thread feeding mechanism and adapted by the opening and closing movement of said jaws to actuate the said thread positioning and feeding mechanism.

12. The device of claim 11, including a finger manipulated lever connected to said needle operating mechanism and adapted to control the reciprocal movement of said needle and a spring means adapted to normally keep the said needle in its retracted position.

13. In a portable hand operated sewing machine, a pair of pincer-like members having handles and grasping jaws, a thread feeding mechanism mounted upon one of the said grasping jaws, means for actuating the thread positioning and feeding mechanism, a plunger type needle reciprocally mounted upon said second grasping jaw, means for reciprocally moving said needle, a thread carrying spool mounted upon a supporting pin within said housing containing the said thread feeding mechanism and means for regulating the tension of said thread carrying spool.

14. The device of claim 13, including a spool supporting pin having annular grooves formed near the outer end of said pin, a tension spring interposed between said spool and wall of said housing and a finger operated adjustable spring clip adapted to engage in one of said annular grooves to hold the spool in place and regulate its tension against said tension spring.

LESTER D. VOLK.

REFERENCES CITED

The following references are of record in the file of this patent:

UNITED STATES PATENTS

| Number | Name | Date |
| --- | --- | --- |
| 63,615 | Collier | Apr. 9, 1867 |
| 306,713 | Barber | Oct. 21, 1884 |
| 568,946 | Hanna | Oct. 6, 1896 |
| 1,794,366 | Collis et al. | Mar. 3, 1931 |

FOREIGN PATENTS

| Number | Country | Date |
| --- | --- | --- |
| 31,983 | Switzerland | Aug. 15, 1904 |